United States Patent [19]
Birri et al.

[11] Patent Number: 5,917,035
[45] Date of Patent: Jun. 29, 1999

[54] OXAZINE DYES, THEIR PREPARATION AND THE USE THEREOF

[75] Inventors: Hanspeter Birri, Pratteln, Switzerland; Gerhard Hanika, Lörrach, Germany; Alex Nicopoulos, Basel, Switzerland

[73] Assignee: Ciba Specialty Chemicals Corporation, Tarrytown, N.Y.

[21] Appl. No.: 09/039,733

[22] Filed: Mar. 16, 1998

Related U.S. Application Data

[63] Continuation of application No. 08/813,711, Mar. 7, 1997, abandoned, which is a continuation of application No. 08/567,868, Dec. 6, 1995, abandoned, which is a continuation of application No. 08/164,279, Dec. 9, 1993, abandoned.

[30] Foreign Application Priority Data

Dec. 15, 1992 [CH] Switzerland ............... 3819/92

[51] Int. Cl.$^6$ ................................. C07D 265/38
[52] U.S. Cl. ............................. 544/103; 544/99
[58] Field of Search ....................... 544/99, 103

[56] References Cited

U.S. PATENT DOCUMENTS

| | | | |
|---|---|---|---|
| 3,663,539 | 5/1972 | Schafer | 260/242 |
| 4,289,880 | 9/1981 | Moser | 544/103 |
| 4,362,873 | 12/1982 | Belfort | 544/103 |
| 4,367,334 | 1/1983 | Loew | 544/103 |
| 5,073,634 | 12/1991 | Dix et al. | 544/103 |

FOREIGN PATENT DOCUMENTS

| | | |
|---|---|---|
| 0055223 | 6/1982 | European Pat. Off. . |
| 0038736 | 10/1981 | France . |
| 1569604 | 8/1970 | Germany . |
| 2259341 | 11/1973 | Germany . |
| 2701677 | 8/1977 | Germany . |
| 2631207 | 1/1978 | Germany . |
| 2929285 | 1/1980 | Germany . |
| 0642987 | 5/1984 | Switzerland . |
| 1190235 | 4/1970 | United Kingdom . |
| 1358488 | 7/1974 | United Kingdom . |

OTHER PUBLICATIONS

Chem. Abst. 88:106759n (1978).
Chem. Abst. 87:(18): 137319b (1977).

*Primary Examiner*—Richard L. Raymond
*Attorney, Agent, or Firm*—Kevin T. Mansfield; David R. Crichton

[57] ABSTRACT

The compounds of formula

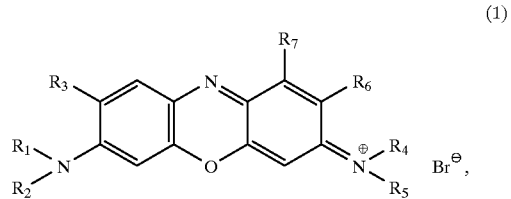

(1)

wherein the substituents are as defined in the claims, are suitable for dyeing or printing, inter alia, polyacrylonitrile and acid-modified polyester fibers, and can furthermore be converted by anion exchange into a physical form suitable for liquid formulations.

2 Claims, No Drawings

OXAZINE DYES, THEIR PREPARATION AND THE USE THEREOF

This application is a continuation of application Ser. No. 08/813,711, filed Mar. 7, 1997, now abandoned, which is a continuation of application Ser. No. 08/567,868, filed Dec. 6, 1995, now abandoned, which is a continuation of application Ser. No. 08/164,279, filed Dec. 9, 1993, now abandoned.

The present invention relates to novel oxazine dyes, to their preparation and to the use thereof for the preparation of storage stable liquid formulations.

A great number of basic oxazine dyes for dyeing e.g., polyacrylonitrile or acid-modified polyesters are known, inter alia from DE-AS 1 569 604 or EP-A 0 038 736. An important purification operation in the synthesis of these dyes consists in precipitating the compounds in the form of a sparingly soluble salt from the reaction medium which salt can then be further processed direct to a solid physical form. An additional requirement made of the precipitated salt is that it can be readily and completely converted into a suitable liquid formulation. The standard practice hitherto has been to convert the cationic dyes by methods that are often troublesome and ecologically not without risk into chlorozincate salts, to precipitate these dyes in the form of these salts and then to convert said salts into the corresponding acetates by anion exchange.

Surprisingly, novel sparingly soluble salts of basic oxazine dyes have now been found that are easy to prepare in higher space-time yield, i.e. more simply and cheaply, and which do not give rise to effluent problems and, in addition, which can be readily converted into a liquid physical form.

Accordingly, the invention relates to compounds of formula

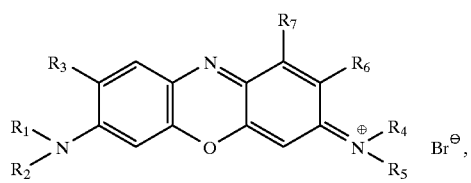

(1)

wherein $R_1$ is hydrogen or unsubstituted or substituted alkyl or phenyl, $R_2$ is hydrogen or unsubstituted or substituted alkyl, $R_3$ is hydrogen, alkyl or alkoxy, $R_4$ is hydrogen or unsubstituted or substituted alkyl or phenyl, $R_5$ is hydrogen or unsubstituted or substituted alkyl, $R_6$ is hydrogen, alkyl or alkoxy, and $R_7$ is hydrogen or alkyl, or $R_6$ and $R_7$, when taken together, form a fused phenyl ring.

$R_1$ or other substituents defined as unsubstituted or substituted phenyl are phenyl or phenyl which is substituted by $C_1$–$C_4$alkyl, cyclohexyl, $C_1$–$C_4$alkoxy, cyano, trifluoromethyl, nitro or halogen. Illustrative examples of preferred phenyl radicals are phenyl and o-, m- or p-methylphenyl.

$R_1$ or other substituents defined as unsubstituted or substituted alkyl may be $C_{1-C4}$alkyl which is unsubstituted or substituted by halogen, hydroxy, cyano, carbamoyl or alkoxy. Typical examples are methyl, ethyl, n- or isopropyl, n-, iso-, sec- or tert-butyl, cyanoethyl and hydroxyethyl. Preferably alkyl is unsubstituted $C_{1-C4}$alkyl and is most preferably methyl or ethyl.

$R_3$ or other substituents defined as alkyl are preferably $C_{1-C4}$alkyl and, most preferably, methyl or ethyl.

$R_3$ or other substituents defined as alkoxy are preferably $C_1$–$C_4$alkoxy, typically n- or isopropoxy, n-, iso-, sec- or tert-butoxy or, preferably, methoxy or ethoxy.

Preferred compounds of formula (1) above are those wherein $R_1$ is hydrogen, methyl, ethyl, hydroxyethyl, phenyl or o-, m- or p-methylphenyl, $R_2$ is hydrogen, methyl or ethyl, $R_3$ is hydrogen, methyl or methoxy, $R_4$ is hydrogen, methyl or ethyl, phenyl or o-, m- or p-methylphenyl, $R_5$ is hydrogen, methyl, ethyl, $R_6$ is hydrogen, methyl or methoxy, and $R_7$ is hydrogen or methyl.

Especially preferred compounds are those of formula

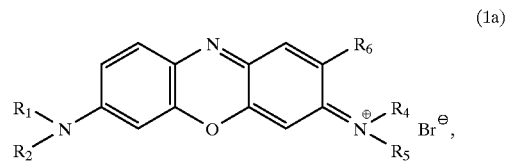

(1a)

wherein $R_1$ and $R_2$ are each independently of the other methyl or ethyl, $R_4$ is hydrogen, methyl, ethyl, phenyl or o-, m- or p-methylphenyl, $R_5$ is hydrogen, methyl, ethyl, and $R_6$ is hydrogen, methyl or methoxy.

A particularly preferred embodiment of the novel process relates to the compound of formula

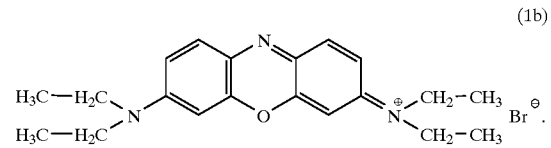

(1b)

The compounds of formula (1) can conveniently be obtained by ion exchange from known basic oxazines, for example from the corresponding tetrachloroferrates.

It is, however, preferred, and constitutes a further object of the invention, to prepare the compounds of formula (1) by a) nitrosating a compound of formula

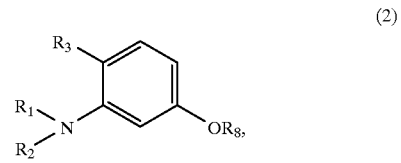

(2)

wherein $R_1$, $R_2$ and $R_3$ are as previously defined and $R_8$ is hydrogen or unsubstituted or substituted alkyl, in a medium containing a dipolar aprotic solvent, hydrobromic acid (HBr) and, as optional component, water, b) condensing the resultant nitroso compound, without isolation, with a compound of formula

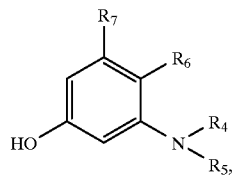
(3)

wherein R4, $R_5$, R6 and $R_7$ are as previously defined, and then in an optional step, c) concentrating the reaction mass by distillation until the dye salt precipitates.

The medium used for the nitrosation step a) of the inventive process contains a dipolar aprotic solvent, conveniently a formamide, preferably N,N-dimethylformamide (DMF), and hydrobromic acid, and may also contain water. A preferred medium for the nitrosation consists of DMF, hydrobromic acid and water, and has a strongly acidic pH, i.e. a pH of e.g. $\leq 2$. The nitrosating reagent is a customary inorganic or organic nitrite, typically an alkali metal nitrite such as sodium nitrite, which is added in solid form or, preferably, in the form of an aqueous solution.

The nitrosation is carried out preferably at a temperature below 50° C. and, most preferably, at room temperature, i.e. at a temperature in the range from c. 15 to 30° C. An approximately stoichiometric amount or a minor excess of nitrite is used, based on the compound of formula (2).

The compounds of formulae (2) and (3) are known per se or they can be prepared in known manner.

The condensation step (b) of the novel process is carried out in general accordance with known processes, conveniently in a medium that contains the dipolar aprotic solvent, hydrobromic acid, and water as optional component. In this step, the preferred procedure comprises charging the reactor with the 3-aminophenol of formula (3) in a medium containing the dipolar aprotic solvent, preferably DMF, and water as optional component, adjusting the pH of this medium with an inorganic acid, preferably hydrobromic acid, to the neutral or slightly acid range, i.e. to pH 4–7, and then slowly running in the nitroso solution obtainable in accordance with a). The condensation reaction is carried out in the temperature range from typically 25 to 120° C. and preferably from 50 to 100° C.

If after conclusion of the condensation a reaction solution is obtained from which the cationic dye does not precipitate or only partially precipitates, then working up is conveniently effected by first removing a specific amount of solvent by distillation from the acidic condensation mixture and subsequently cooling the residual reaction solution. If the reaction mixture obtained after conclusion of the condensation contains large amounts of DMF and water, then it is preferred to subject this reaction mixture to vacuum distillation and then to cool the concentrated reaction solution conveniently to room temperature. A portion of the solvent distillate can afterwards be reused for the nitrosation.

The bromides of formula (1) precipitate in the chosen reaction medium in crystalline form and in very good purity in almost quantitative yield, while impurities remain in solution. A very pure dye of high tinctorial strength is obtained in this manner without troublesome isolation and purification steps.

A particularly preferred embodiment of this invention relates to a process for the preparation of the compound of formula

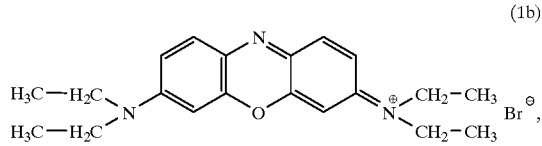
(1b)

which comprises

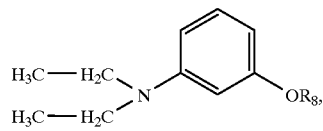

a) nitrosating a compound of formula
wherein $R_8$ is hydrogen, methyl or ethyl, in a medium containing DMF, hydrobromic acid and water, b) condensing the resultant nitroso compound, without isolation, with a compound of formula

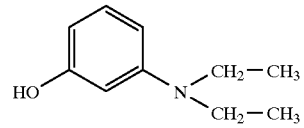

in a solvent mixture comprising DMF, hydrobromic acid and water, and c) concentrating the reaction solution by distillation until the dye salt precipitates.

The novel compounds of formula (1) and (1a) or (1b) are suitable for dyeing or printing tanned cellulose fibers, silk, leather or man-made fibers such as acetate rayon, polyamide fibers or acid-modified polyamide or polyester fibers and, in particular fibers, containing polyacrylonitrile as well as polyvinylidene cyanide. The novel compounds are easy to handle and have good solubility in dyebaths. When used for dyeing by standard processes, they produce dyeings of good aground fastness properties.

It is a particular advantage of the novel compounds of formula (1) that they can be easily converted into stable liquid formulations.

The invention therefore further relates to a process for the preparation of stable liquid formulations of compounds of formula

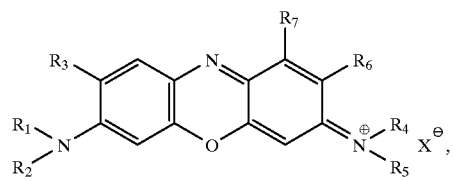
(1c)

wherein $X^\ominus$ is the anion of a monocarboxylic acid, $R_1$ is hydrogen or unsubstituted or substituted alkyl or phenyl, $R_2$ is hydrogen or unsubstituted or substituted alkyl, $R_3$ is hydrogen, alkyl or alkoxy, R4 is hydrogen or unsubstituted or substituted alkyl or phenyl, $R_5$ is hydrogen or unsubstituted or substituted alkyl, $R_6$ is hydrogen, alkyl or alkoxy, and $R_7$ is hydrogen or alkyl, or $R_6$ together with $R_7$ form a fused phenyl ring, which process comprises treating a compound of formula

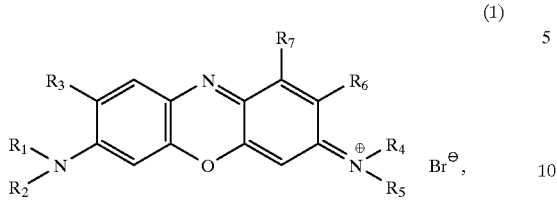

wherein the substituents $R_1$–$R_7$ are each as previously defined, in a medium containing the monocarboxylic acid HX corresponding to the anion $X^\ominus$ and a salt $Ka^\oplus X^\ominus$ of said acid, wherein $Ka^\oplus$ is a cation, isolating the precipitated bromide and removing any excess carboxylic acid HX, conveniently by distillation, and/or adjusting the tinctorial strength by addition of water.

In formula (1c), the substituents $R_1$, $R_2$, $R_3$, $R_4$, $R_5$, $R_6$ and $R_7$ each have the meanings and preferred meanings accorded to them previously. The anion $X^\ominus$ is conveniently the anion of an unsubstituted or hydroxy-substituted $C_1$–$C_8$alkanoic acid. Illustrative examples are the anion of formic acid, acetic acid, propionic acid, butyric acid, pentanoic acid, hexanoic acid, heptanoic acid, octanoic acid or lactic acid. $X^\ominus$ is preferably the anion of formic acid or lactic acid and, most preferably, the anion of acetic acid, i.e. the compounds of formula (1c) are preferably formates, lactates or, preferably, acetates.

Accordingly, HX is one of the above cited monocarboxylic acids and $Ka^\oplus X^\ominus$ is the salt of one of the cited acids.

$Ka^\oplus$ is conveniently an alkaline earth metal cation or, preferably, an alkali metal cation, conveniently the lithium cation or, preferably, the sodium or potassium cation.

Typical examples of preferred salts $Ka^\oplus X^\ominus$ are therefore sodium and potassium formate, sodium and potassium lactate and, preferably, sodium and potassium acetate.

The conversion of the bromide of formula (1) by anion exchange in the medium containing the carboxylic acid and the salt thereof is conveniently carried out in the temperature range from 20 to 150° C., preferably from 30 to 100° C. and, most preferably, from 50 to 80° C. The reaction medium should preferably be anhydrous. In some cases, hydrophilic agents such as inorganic or organic acid anhydrides, e.g. acetic anhydride, anhydrous salts or dried M-Al silicates (zeolites), may be added to reduce the water content of the reaction medium.

A preferred variant of the process consists in stirring the moist filter cake obtained in the previously described preparation of ther bromide of formula (1) direct in a medium comprising a carboxylic acid HX, a salt $Ka^\oplus X^\ominus$ of said acid and a hydrophilic agent, at elevated temperature, i.e. at a temperature conveniently in the range from 50 to 80° C., isolating the precipitated bromide by filtration after cooling, removing excess carboxylic acid HX by distillation, and adjusting the tinctorial strength of the solution by addition of water.

A particularly preferred embodiment of the invention relates to a process for the preparation of a stable liquid formulation of the compound of formula $$\text{(1d)}$$

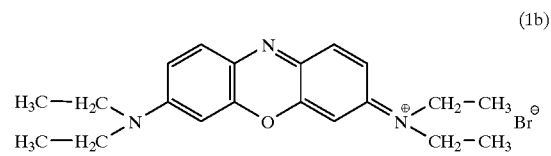

which comprises treating the moist filter cake obtained in the synthesis of the compound of formula $$\text{(1b)}$$

direct in a medium containing acetic acid, sodium or potassium acetate and acetic anhydride, at elevated temperature, then isolating the precipitated alkali metal bromide by filtration, removing any excess acetic acid and/or adjusting the tinctorial strength of the solution by addition of water.

The invention is illustrated by the following Examples in which parts and percentages are by weight.

Example 1

A. Nitrosation

Under light nitrogen blanketing, 880 parts of dimethyl formamide (DMF) are charged to a suitable reactor and 174 parts of 3-diethylamino-1-ethoxybenzene are added at room temperature. Water and ice are added and then 158.8 parts of 100% hydrobromic acid are run in over c. 15 minutes such that the temperature does not exceed c. 20° C. While keeping the temperature constant (c. 20° C.), 63.2 parts of sodium nitrite in the form of a 40% aqeuous solution are added over about 1.5 hours and the reaction mixture is stirred for about c. 30 minutes.

B. Condensation

Under light nitrogen blanketing, 200 parts of DMF are charged to a suitable reactor and 151.1 parts of 3-diethylaminophenol are added at room temperature and the pH is adjusted to the slightly acidic range (pH c. 5–6) with hydrobromic acid. The resultant solution is heated to c. 67–70° C. and the nitroso solution of (A) is run in over about 3.5–4 hours. The reaction mixture is stired for c. 45 minutes at 65–70° C., and then the distillate consisting mainly of DMF and water is removed by vacuum distillation (internal temperature c. 55–75° C., internal pressure c. 100 mbar). The residual dark blue reaction solution is cooled to room temperature, whereupon the product precipitates in almost quantitative yield. The precipitate is isolated by filtration, washed and dried, giving the dye of formula

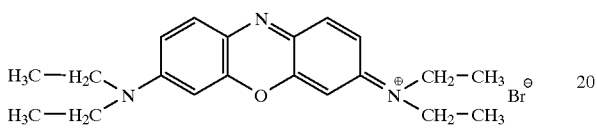

as a pure product of low salt content and high tinctorial strength.

C. Preparation of a Liquid Physical Form

A suitable reactor is charged with 328 parts of the moist filter cake obtained in B) after filtration, 192 parts of potassium acetate, 720 parts of 100% acetic acid and 160 parts of acetic anhydride. The mixture is stirred and heated to 70–75° C. and kept for c. 4 hours at this temperature. The reaction mixture is subsequently cooled to c. 30° C. and the precipitated potassium bromide is removed by filtration. The filtrate is then subjected to vacuum distillation and c. 540 g of acetic acid are removed by distillation. The residual concentrated solution is then adjusted to the desired tinctorial strength with water to give a stable liquid physical form of the dye of formula

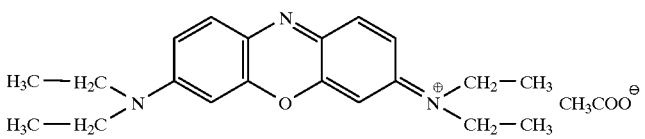

Examples 2–11

The following compounds can be prepared and converted into a liquid physical form in accordance with the general procedure described in Example 1:

2

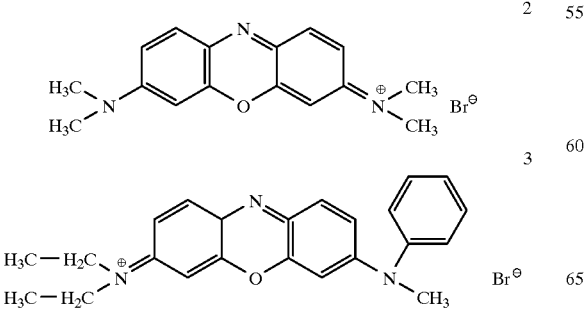

3

4

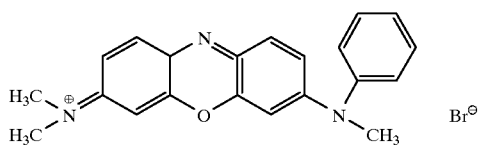

5

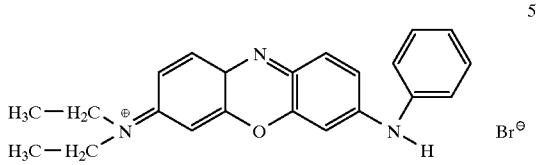

6

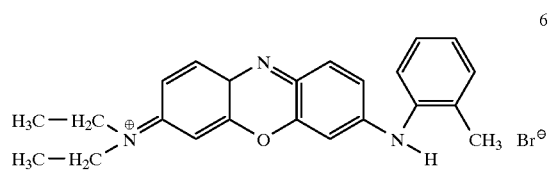

7

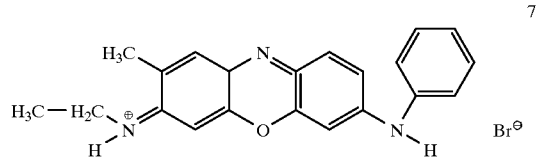

8

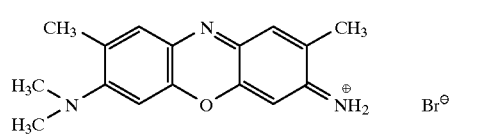

9

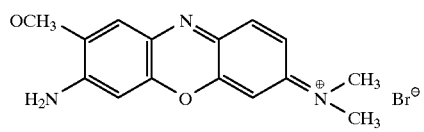

10

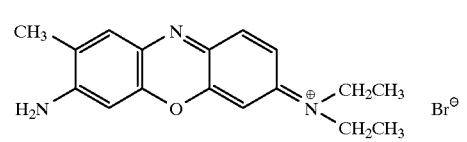

-continued

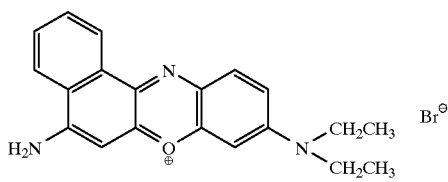

11

What is claimed is:

1. The compound of formula

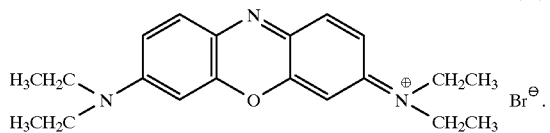

(1b)

2. A process for the preparation of a compound of formula (1b) according to claim 1, which comprises a) nitrosating a compound of formula

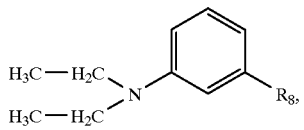

wherein $R_8$ is hydrogen, methyl or ethyl, in a medium containing N,N-dimethylformamide (DMF), hydrobromic acid (HBr) and water, b) condensing the resultant nitroso compound, without isolation, with a compound of formula

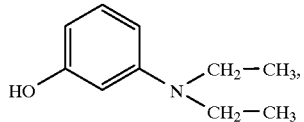

in a solvent mixture comprising DMF, hydrobromic acid and water, and c) concentrating the reaction solution by distillation until the dye salt precipitates.

* * * * *